United States Patent
Samaniego et al.

(10) Patent No.: US 12,270,896 B2
(45) Date of Patent: Apr. 8, 2025

(54) MULTI-HYPOTHESIS SPATIALLY-VARIANT AUTOFOCUS SYSTEM AND METHOD FOR FOCUSING SAR IMAGERY

(71) Applicant: Raytheon Company, Arlington, VA (US)

(72) Inventors: Raymond Samaniego, Prosper, TX (US); Aaron C. Wallace, Fairview, TX (US)

(73) Assignee: Raytheon Company, Arlington, VA (US)

( * ) Notice: Subject to any disclaimer, the term of this patent is extended or adjusted under 35 U.S.C. 154(b) by 885 days.

(21) Appl. No.: 17/341,952

(22) Filed: Jun. 8, 2021

(65) Prior Publication Data

US 2024/0329234 A1    Oct. 3, 2024

(51) Int. Cl.
   *G01S 13/90* (2006.01)

(52) U.S. Cl.
   CPC ............... *G01S 13/9019* (2019.05)

(58) Field of Classification Search
   CPC ............... G01S 13/9019; G01S 13/90
   See application file for complete search history.

(56) References Cited

U.S. PATENT DOCUMENTS

| | | | | |
|---|---|---|---|---|
| 6,011,505 A * | 1/2000 | Poehler | ............... | G01S 13/9019 342/25 C |
| 2008/0042893 A1* | 2/2008 | Connell | ............... | G01S 13/9019 342/25 F |
| 2009/0002220 A1* | 1/2009 | Lovberg | ............... | G01S 13/935 342/33 |

FOREIGN PATENT DOCUMENTS

CN    107748362 A    *    3/2018    ............    G01S 13/904

OTHER PUBLICATIONS

Li et al. "Extension and Evaluation of PGA in ScanSAR Mode using Full-Aperture Approach," IEEE Geoscience and Remote Sensing Letters, vol. 12, No. 4, Apr. 2015 (Year: 2015).*

Huang, Darong, et al., "Full-Aperture Azimuth Spatial-Variant Autofocus Based on Contrast Maximization for Highly Squinted Synthetic Aperture Radar", IEEE Transactions on Geoscience and Remote Sensing, vol. 58, No. 1, (Jan. 2020), 330-347.

Morrison, Robert L., et al., "SAR Image Autofocus By Sharpness Optimization: A Theoretical Study", IEEE Transactions on Image Processing, vol. 16, No. 9, (Sep. 2007), 2309-2321.

Yifei, Ji, et al., "Extended Scintillation Phase Gradient Autofocus in Future Spaceborne P-band SAR Mission", Science China Information Sciences, (Feb. 2020), 19 pgs.

* cited by examiner

*Primary Examiner* — James R Hulka
*Assistant Examiner* — Samarina Makhdoom
(74) *Attorney, Agent, or Firm* — Schwegman Lundberg & Woessner, P.A.

(57) ABSTRACT

A multi-hypothesis spatially-variant autofocus system for processing and focusing radar images, such as synthetic aperture radar (SAR) imagery, is configured to compute phase corrections and apply multiple autofocus strategies to overlapping image tiles for progressively smaller image tile sizes. Correction factors for the image tiles may be selected on a per-tile basis based on various metrics. In some embodiments, one or more phase-gradient autofocus (PGA) algorithms may be applied to window-size weighted versions of the overlapping image tiles for the progressively smaller image tile sizes.

24 Claims, 9 Drawing Sheets

MULTI-HYPOTHESIS SPATIALLY-VARIANT AUTOFOCUS SYSTEM AND METHOD FOR FOCUSING SAR IMAGERY

GOVERNMENT RIGHTS

This invention was made with Government support under HQ0727-16-D-0006 ATSP4, TO HQ072718F1617. The Government has certain rights in this invention.

TECHNICAL FIELD

Embodiments pertain to image processing. Some embodiments relate to focusing synthetic aperture radar (SAR) images.

BACKGROUND

One issue with focusing synthetic aperture radar (SAR) images is the spatially varying large, high-order phase errors over wide areas and difficult geometries. Conventional autofocus techniques do not adequately address the spatially-variant nature of SAR images. This is particularly an issue with post-IFA SAR imagery.

Thus, there are general needs for systems and methods for focusing SAR images that better address the spatially-variant nature of SAR images.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Embodiments are directed to a multi-hypothesis spatially-variant autofocus system for processing and focusing radar images, such as synthetic aperture radar (SAR) imagery. In these embodiments, phase corrections may be computed and multiple autofocus strategies may be applied to overlapping image tiles for progressively smaller image tile sizes. Correction factors for the image tiles may be selected on a per-tile basis based on various metrics. These embodiments are described in more detail below.

In some embodiments, one or more phase-gradient autofocus (PGA) algorithms may be applied to window-size weighted versions of the overlapping image tiles for the progressively smaller image tile sizes. In some embodiments, the various metrics may include tile contrast, a noise performance, a dynamic range and a scatter stationarity. In some embodiments, the correction factors may be selected based on whether an improvement in one or more of the various metrics results from application of a correction factor to an image tile. In some embodiments, a selected correction factor may be applied to each image tile to generate focused tiles and the image may be updated by inserting the non-overlapping portions of the focused tiles into the image. In these embodiments, a correction factor for an image tile is not selected when an improvement in one or more of the various metrics results from application of the correction factor to an image tile is not achieved. These embodiments are described in more detail below. Some of these embodiments may maximize tile image contrast for iteratively reduced tile sizes for progressively localized focusing.

Figure 1:
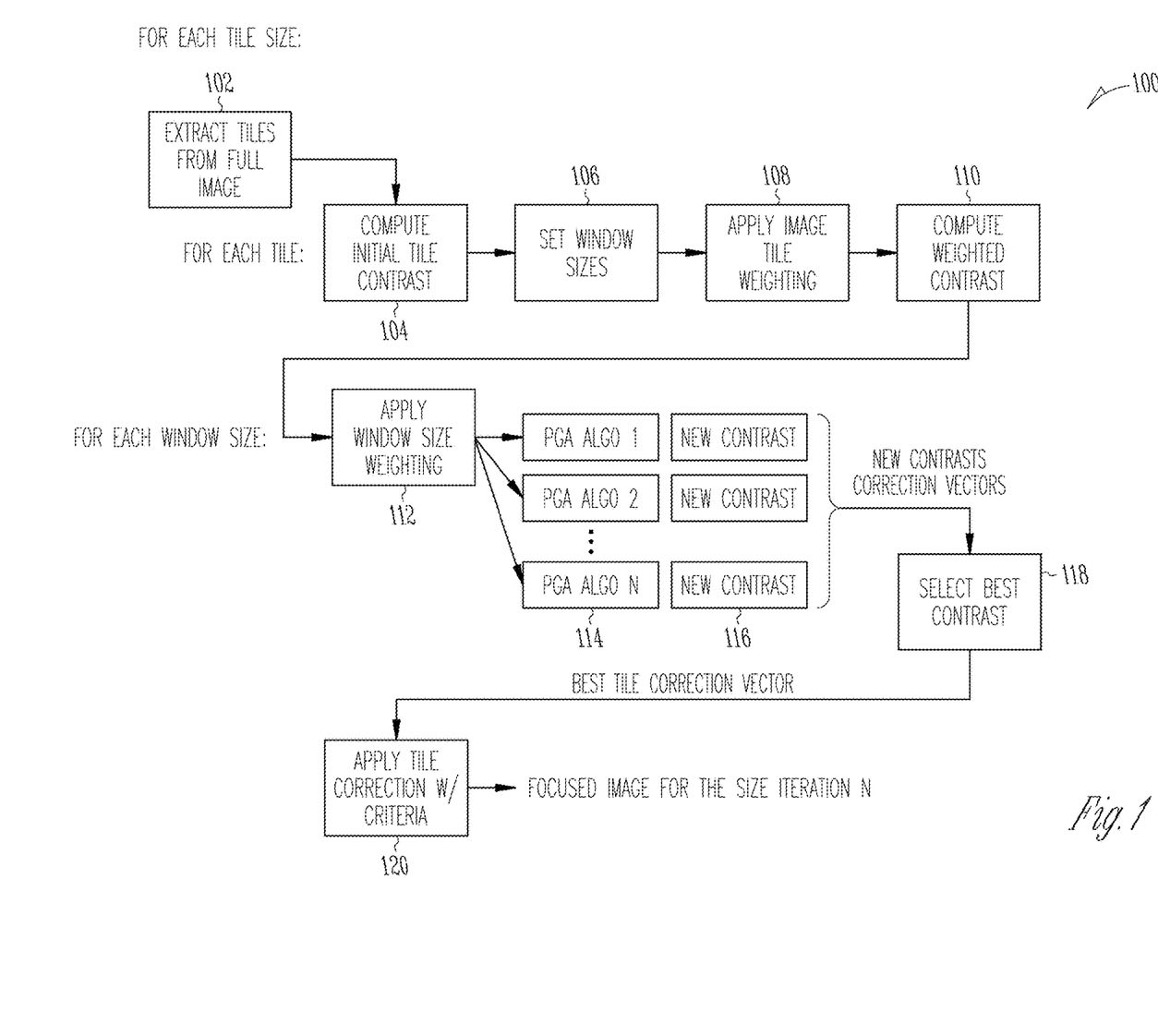
FIG. 1 is a functional block diagram of a multi-hypothesis spatially-variant autofocus system, in accordance with some embodiments.

FIG. 1 is a functional block diagram of a multi-hypothesis spatially-variant autofocus system in accordance with some embodiments. Multi-hypothesis spatially-variant autofocus system 100 is configured for processing and focusing radar images. The system 100 may comprise processing circuitry configured to perform an iterative process for a plurality of tile size iterations. In these embodiments, to perform the iterative process, the system 100 may extract (operation 102) overlapping tiles of an initial tile size from an initial radar image and may compute (operation 104) an initial figure of merit for each tile. In these embodiments, the system 100 may apply one or more window size weighting functions to each row of the tile, centered on row peak (operation 112).

One or more phase-gradient autofocus (PGA) algorithms 114 may be applied to each window-size weighted version of each tile and a new figure of merit (operation 116) (e.g., a contrast) may be determined for each window size weighted version of the tiles for each of the one or more applied PGA algorithms. In these embodiments, the system 100 may select a correction vector (operation 118) for each tile based on a comparison of the figures of merit and apply (operation 120) the selected correction vector to each tile to generate focused tiles. In these embodiments, the image may be updated by inserting only the non-overlapping portions (e.g., non-overlapping pixels) of the focused tiles into the image, although the scope of the embodiments is not limited in this respect.

In these embodiments, although an entire tile will get focused for each iteration, the entire tile is not inserted back into the image because the tile overlaps with its neighbors in both rows and columns. For example, in the case of 50% overlap, only the middle 50% of rows and middle 50% of columns of pixels are updated when re-inserting the focused tile back into the reference full image for that tile-size iteration. The insertion of only the non-overlapping portions helps prevent over-writing of pixels from neighbor tiles that may have been just focused. The insertion of only the non-overlapping portions also helps avoid possible edge effects that can happen as a result of the focusing process. In these embodiments, each pixel in the full image may only be updated once per iteration, although the scope of the embodiments is not limited in this respect. In these embodiments, for the full image edges, there may not be a neighbor tile contributing and the correction may be applied all the way to the edge.

Figure 2A:
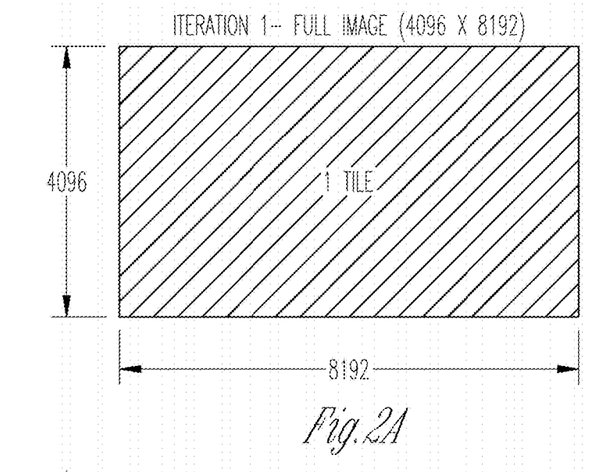
FIGS. 2A, 2B, 2C, and 2D illustrate a progressively reduced tile size strategy, in accordance with some embodiments.
Figure 2B:
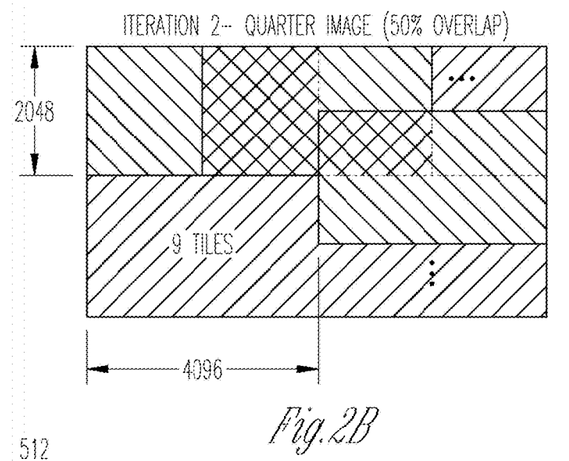
Figure 2C:
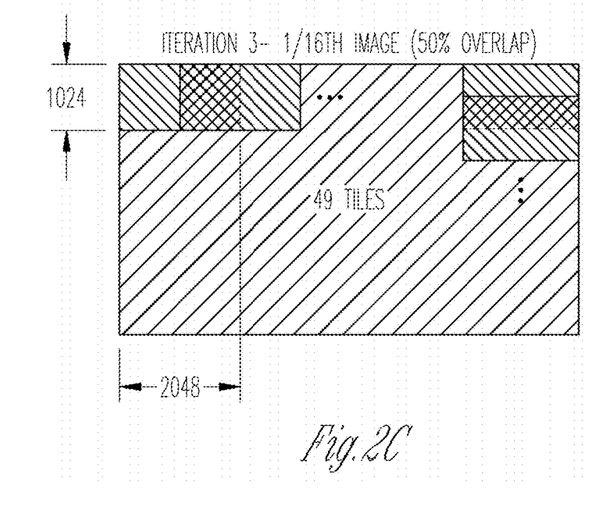
Figure 2D:
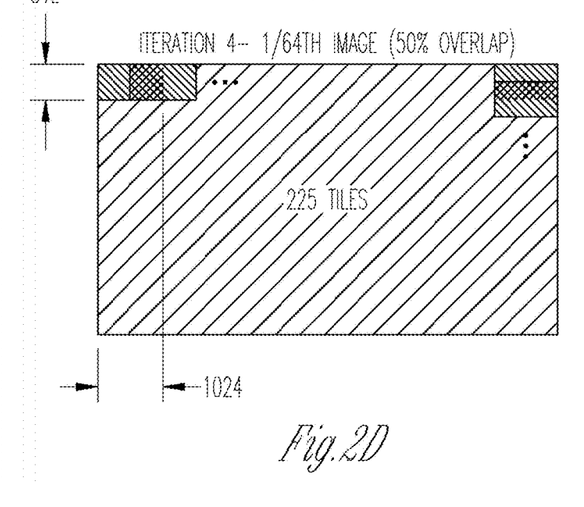

FIGS. 2A, 2B, 2C, and 2D illustrate a progressively reduced tile size strategy in accordance with some embodiments. FIG. 2A illustrates an initial tile size for a first iteration (e.g., 4096×8192 pixels). FIG. 2B illustrates a second iteration with nine overlapping tiles with 50% overlap with a tile size of 2048×4096 pixels. FIG. 2C illustrates a third iteration with 49 overlapping tiles with 50% overlap with a tile size of 1024×2048 pixels. FIG. 2D illustrates a fourth iteration with 225 overlapping tiles with 50% overlap with a tile size of 512×1024 pixels.

In some embodiments, for each subsequent tile-size iteration, the system 100 (FIG. 1) may generate an updated image by progressively reducing a tile size of the overlapping tiles. In these embodiments, for each subsequent tile-size iteration, overlapping tiles with a progressively reduced tile size may be extracted from the updated image that is generated from a prior tile-size iteration and an initial figure of merit for each tile is generated for the updated image, although the scope of the embodiments is not limited in this respect.

In these embodiments, the correction vector that is selected for each tile for use in generating the updated image for a tile-size iteration is not necessarily based on use of the same window-size weighting or based on the same PGA algorithm. In these embodiments, any given tile on any given tile-size iteration may be focused with any combination of window size or PGA algorithm, which may be independent of any other tile on any other tile-size iteration.

In some embodiments, the system 100 may also include a multi-hypothesis PGA engine configured for performing a plurality of different PGA algorithms 114 (FIG. 1). In these embodiments, for each iteration the system may apply at least two of the different PGA algorithms to each window-size weighted version of each tile by injecting each window size weighted version of the tiles into the multi-hypothesis PGA engine. In some embodiments, the different PGA algorithms 114 includes at least some of a standard PGA weighting algorithm, a coherence-weighted PGA algorithm, a Super-PGA algorithm, and custom PGA weighting algorithm. Embodiments disclosed herein are not be limited to the use of PGA algorithms. In some embodiments, one or more non-PGA algorithms may be applied instead of or in addition to the one or more different PGA algorithms.

In some embodiments, the initial figure of merit is an initial tile contrast. In these embodiments, the new figure of merit is a new tile contrast, and for each window size weighted version of a tile and for each of the applied PGA algorithms, the correction vector that is selected for a tile may be selected to provide a highest contrast, although the scope of the embodiments is not limited in this respect.

In some embodiments, the system 100 may apply the selected correction vector (operation 120) to an associated one of the tiles if the selected correction vector provides an improvement in tile contrast based on a comparison between the new tile contrast and the initial tile contrast. In these embodiments, the system 100 may refrain from applying the selected correction vector an associated one of the tiles if the selected correction vector does not provide an improvement in tile contrast. In these embodiments, the prior figure of merit may be selected when none of the new figures of merit are better than the prior figure of merit for a particular tile. Accordingly, a prior version of the tile may be used, and the image would not be updated for this tile, although the scope of the embodiments is not limited in this respect.

In some embodiments, for each subsequent tile-size iteration, only the overlapping tiles with a progressively reduced tile size are extracted from lower-contrast portions of the updated image. In these embodiments, for a subsequent tile-size iteration, the system 100 may refrain from extracting overlapping tiles from higher-contrast portions of the updated image. In these embodiments, the entire updated image is not reprocessed for each iteration (e.g., only lower-contrast portions are reprocessed). In these embodiments, to reduce compute time, a threshold (e.g., based on contrast) may be set to decide if a tile is to be reprocessed (i.e., to attempt a focusing evolution on that tile). For example, if the tile is primarily noise (i.e., contains a radar shadow), then it may not be necessary to reprocess that tile. In some embodiments, factors other than contrast may be used determine if a tile should be reprocessed in a subsequent tile-size iteration.

In some situations, additional focusing may create undesirable artifacts that have higher contrast than a prior iteration or than the original tile. In these situations, a tile may be excluded from additional processing. For example, a tile may be excluded if some scatterers in that tile are illuminated in different or unequal portions of the synthetic aperture because additional focusing may do more harm than good (e.g., create undesirable artifacts). In some embodiments, the system 100 may refrain from performing a subsequent tile-size iteration on a tile if in the tile had been illuminated in different portions of a synthetic aperture, although the scope of the embodiments is not limited in this respect.

In some embodiments, the tiles are extracted to have at least a 50% overlap although the scope of the embodiments is not limited in the respect. In some embodiments, the amount of overlap may range from at least 50% to 60% or greater, although the scope of the embodiments is not limited in this respect.

In some embodiments, the initial figure of merit and the new figures of merit comprise one or more of a tile contrast, a noise performance, a dynamic range and a scatter stationarity although the scope of the embodiments is not limited in the respect as other criterion may be employed.

In some embodiments, the initial radar image comprises a synthetic aperture radar (SAR) image, although the scope of the embodiments is not limited in this respect as other modes of radar images (e.g., inverse SAR (ISAR)) may be used. In some embodiments, the initial radar image may be a post-IFA (image formation algorithm) image in which scatterer migration through range cells has been removed by the IFA, although the scope of the embodiments is not limited in this respect.

In some embodiments, prior to application of the one or more window size weighting functions to each tile, the processing circuitry may set filter window sizes (operation 106) for each tile. In these embodiments, multiple window sizes may be selected and applied within a PGA algorithm 114 to each range cell peak, as a low-pass filter of varying bandwidths, allowing for higher-order frequency corrections, or lower-order frequency corrections, as appropriate, based on a contrast comparison among the ensemble of window sizes. In these embodiments, after setting window sizes (operation 106), image tile weighting may be applied (operation 108) and a weighted contrast may be computed (operation 110), although the scope of the embodiments is not limited in this respect.

In some embodiments, the processing circuitry may provide (e.g., inject) a tile to focus to a PGA algorithm 114. The PGA algorithm 114 may identify, for each row (i.e., a range bin), a dominant scatterer in the image domain. The dominant scatter may be shifted to a zero-phase gradient and the peak of the window may be placed over this zero-phase location to effectively suppress scatterers by an amount proportional to their distance from zero phase. In some of these embodiments, a Hamming Window may be used for the windowing function, although the scope of the embodiments is not limited in this respect. The window size parameter may be used to determine what portion of the columns will be kept and what portion will be nulled.

In some embodiments, the window size may be selected based on a log 2 scale (e.g., 8192, 4096, 2048, 1024, 512, . . . ) to provide a wider range of sizes. In some other embodiments, the window size may be selected based on linear scale (e.g., a linear scale of eight window sizes (128, 112, 96, 80, 64, . . . )) although the scope of the embodiments is not limited to eight window sizes as other window sizes may be used. In these embodiments, a larger window size will produce a correction vector that can compensate for high-frequency phase errors, while a smaller tile size will mute any high frequency phase components and the phase correction will be of lower order. In these embodiments, different window sizes and the results may be compared to determine a more optimal frequency range that will be corrected since the true correctable phase error frequency range is not known, although the scope of the embodiments is not limited in this respect.

In some embodiments, the processing circuitry may comprise one or more graphics processing units (GPUs) implementing GPU-accelerated computing to allow real-time or near-real time processing of the radar image, although the scope of the embodiments is not limited in this respect as other instantiations may be used.

In some embodiments, the processing circuitry may comprise one or more conventional central processing units (CPUs) running a scripting language, although the scope of the embodiments is not limited in this respect. In some embodiments, the one or more CPUs may use something other than a scripting language (e.g., a compiled language such as C/C++, FORTRAN, etc.). In some embodiments, MATLAB (a script-based language) may be used and may make calls to C/C++ compiled binaries for improved processing speed.

Some embodiments are directed to a non-transitory computer-readable storage medium that stores instructions for execution by processing circuitry of a multi-hypothesis spatially-variant autofocus system for processing radar images.

Some embodiments are directed to a method for focusing synthetic aperture radar (SAR) imagery. In these embodiments, the method may include computing phase corrections and applying multiple autofocus strategies to overlapping image tiles for progressively smaller image tile sizes. The method may also include selecting correction factors for the image tiles on a per-tile basis based on various metrics.

In some embodiments, applying multiple autofocus strategies may include applying one or more phase-gradient autofocus (PGA) algorithms to window-size weighted versions of the overlapping image tiles for the progressively smaller image tile sizes. In these embodiments, the various metrics may comprise tile contrast, a noise performance, a dynamic range and/or a scatter stationarity. In these embodiments, selecting the correction factors may include determining whether an improvement in one or more of the various metrics results from application of a correction factor to an image tile.

In some embodiments, the method may also include applying the selected correction factor to each image tile to generate focused tiles and updating the image by inserting only the non-overlapping portions of the focused tiles into the image. In some embodiments, the method may include refraining from selecting a correction factor for an image tile when an improvement in one or more of the various metrics results from application of a correction factor to an image tile is not achieved.

Figure 3A:
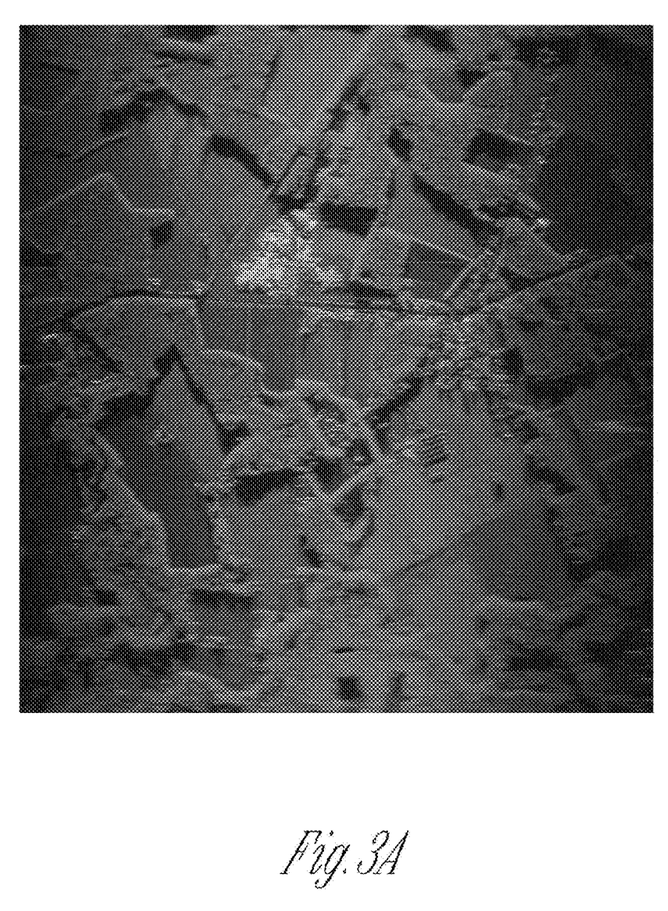
FIGS. 3A and 3B illustrate an initial image and contrast range bin plot, in accordance with some embodiments.
Figure 3B:
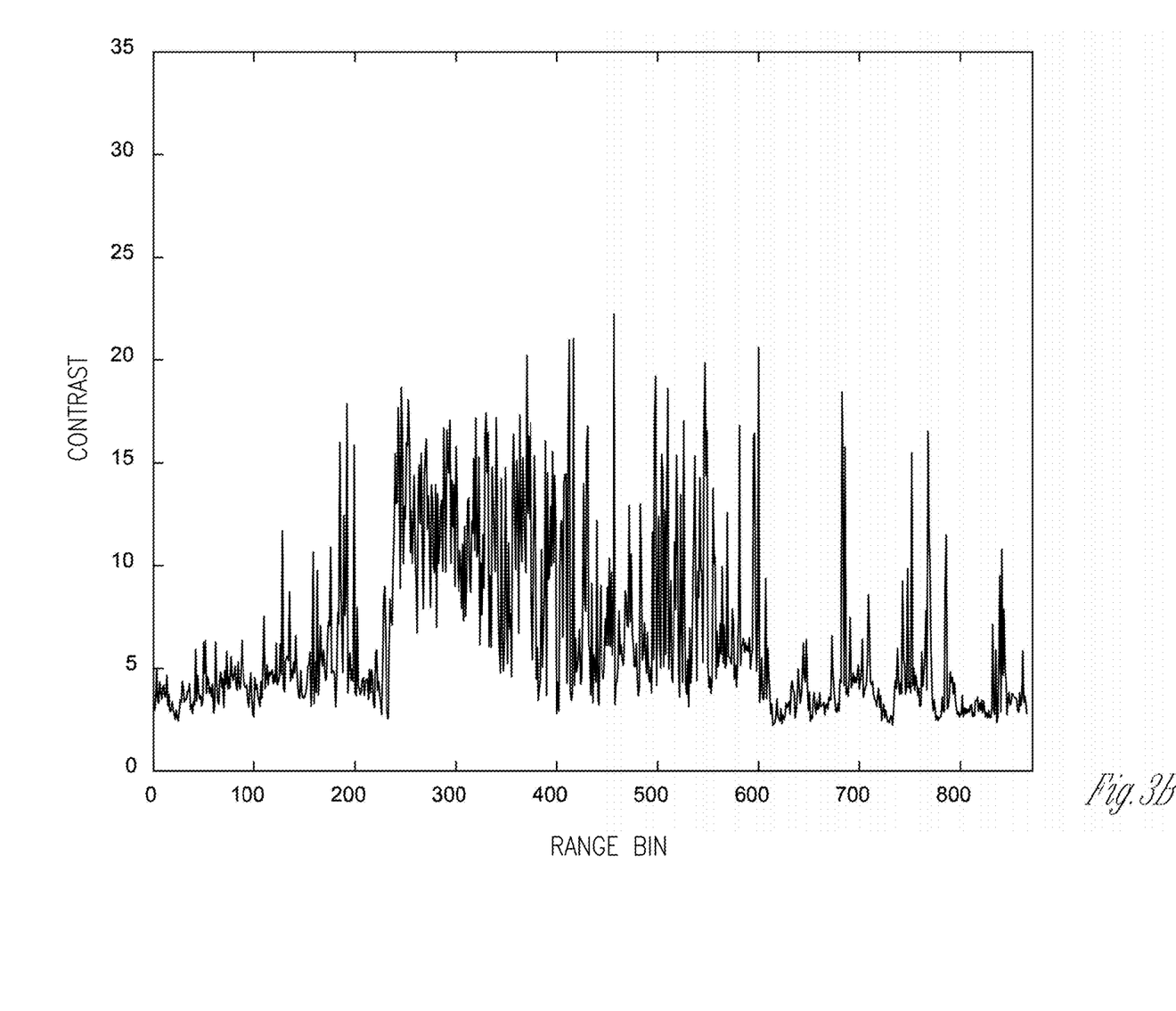
Figure 4A:
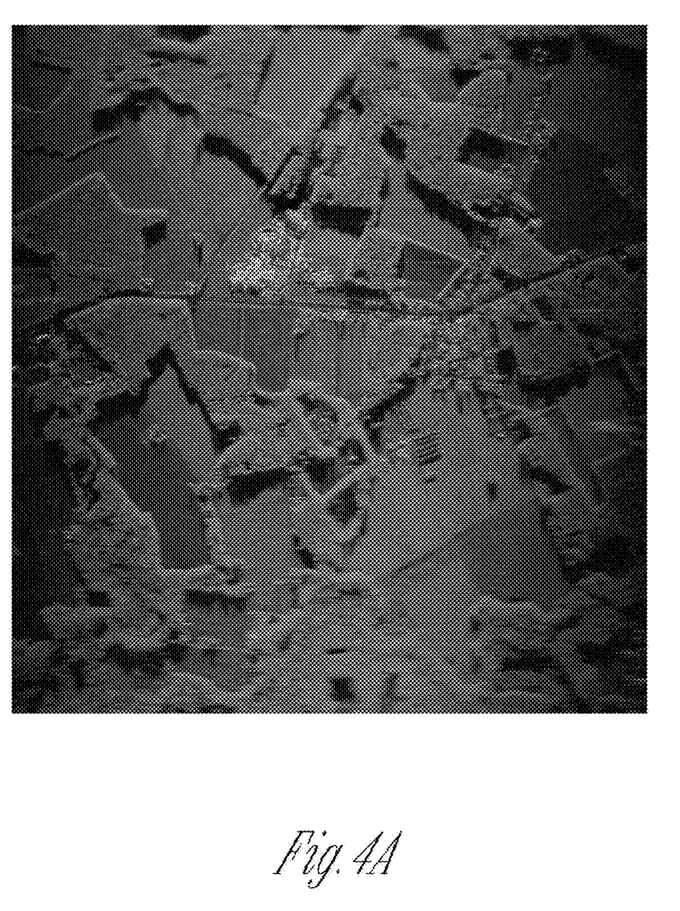
FIGS. 4A and 4B illustrate an updated image and contrast range bin plot after a global autofocus, in accordance with some embodiments.
Figure 4B:
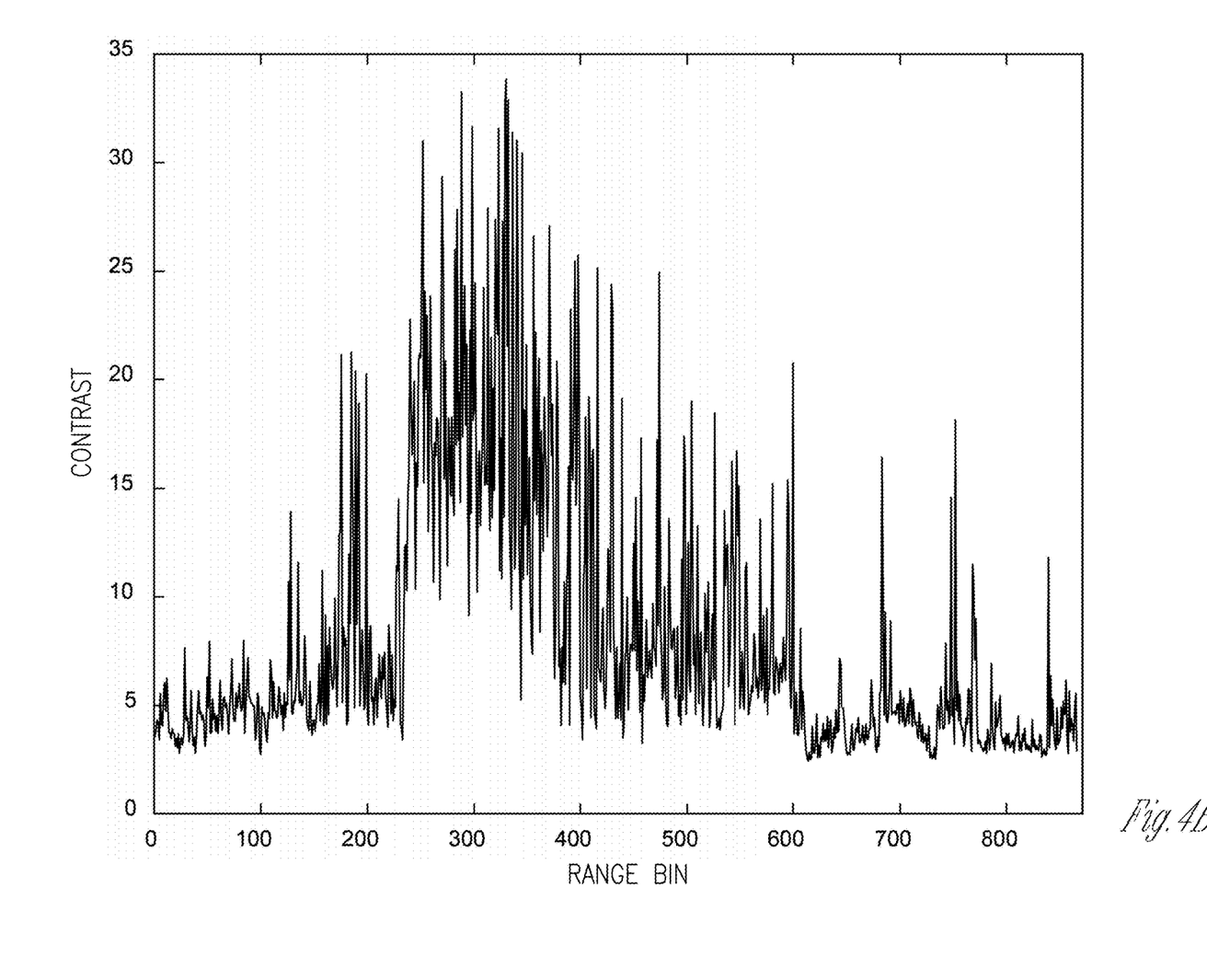
Figure 5A:
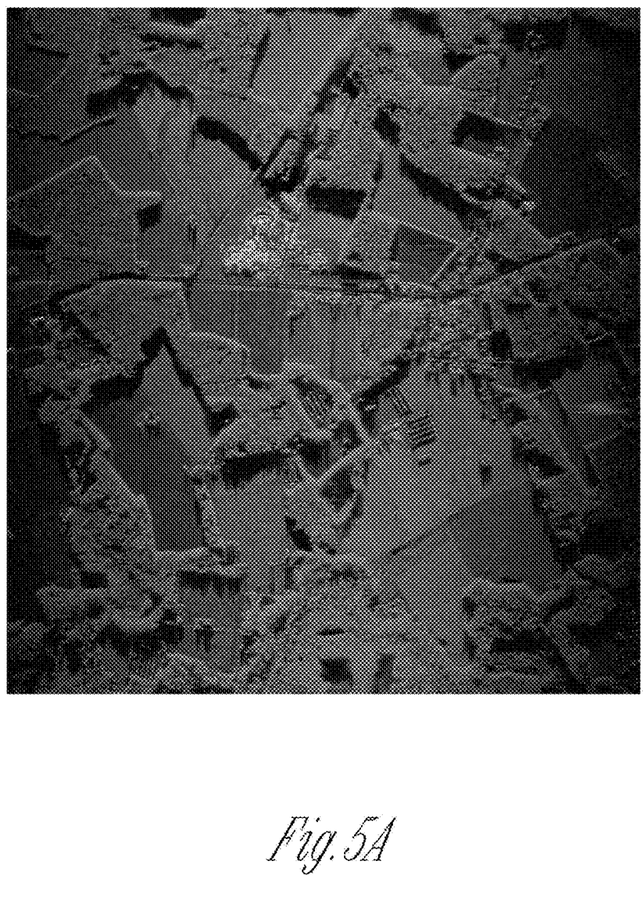
FIGS. 5A and 5B illustrate an updated image and contrast range bin plot after several tile-size iterations, in accordance with some embodiments.
Figure 5B:
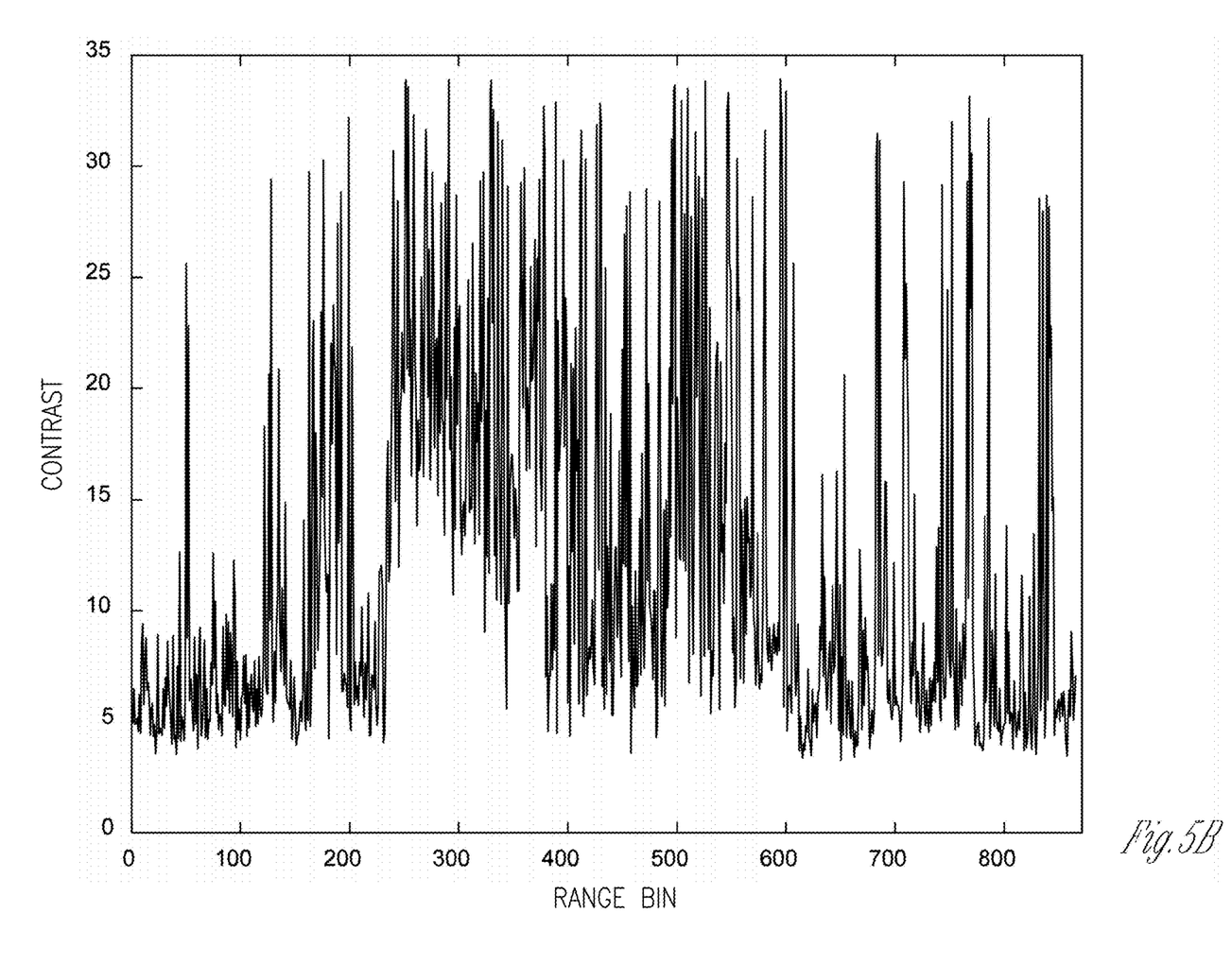

FIGS. 3A and 3B illustrate an initial image and contrast range bin plot in accordance with some embodiments. FIGS. 4A and 4B illustrate an updated image and contrast range bin plot after a global autofocus in accordance with some embodiments. FIGS. 5A and 5B illustrate an updated image and contrast range bin plot after several tile-size iterations, in accordance with some embodiments.

As illustrated in FIG. 3B, the initial image has a mean contrast of 6.6. As illustrated in FIG. 4B, after a global autofocus, the updated image has a mean contrast of 8.2. As illustrated in FIG. 5B, after several tile-size iterations, the updated image has a mean contrast of 12.1.

Some embodiments are directed to handling multiple defocusing mechanisms common in SAR imagery through computing phase corrections for progressively smaller image tile sizes to provide increasingly finer localization, combined with employing multiple autofocus strategies and selecting the best on a per-tile basis using various metrics including tile contrast, noise performance, dynamic range, and stationarity.

Figure 6:
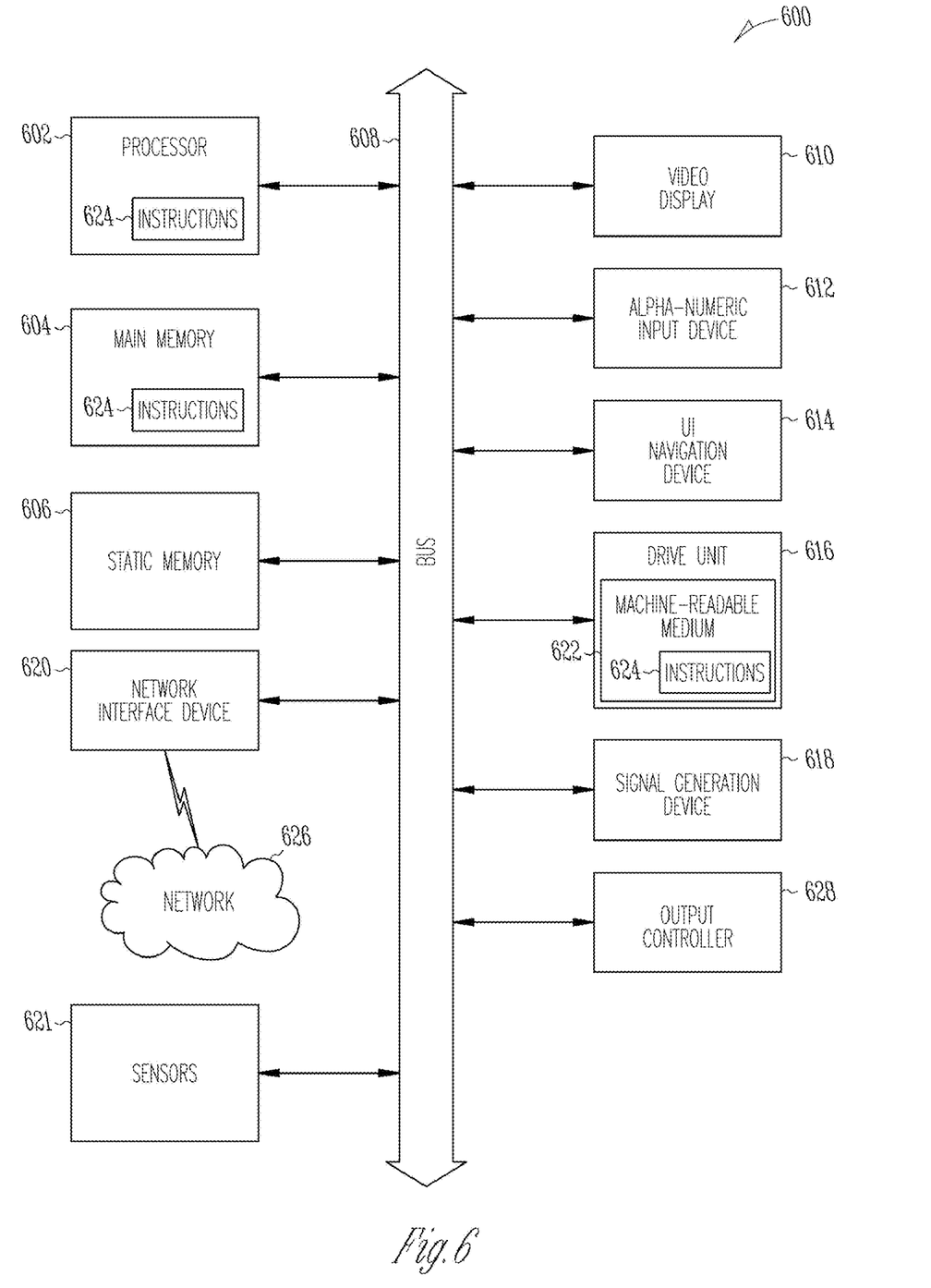
FIG. 6 illustrates a block diagram of an example machine upon which any one or more of the techniques (e.g., methodologies) discussed herein may be performed, in accordance with some embodiments.

In some embodiments, tiles are looped from largest to smallest, tiles are injected into a multi-hypothesis PGA engine, and varying filter window sizes and tile weighting are applied to the tile. In some embodiments, multiple PGA weighting strategies including standard PGA, coherence-weighted PGA, Super-PGA, or a custom PGA may be applied along with phase correction and the resulting associated contrast may be reported. In some embodiments, a best algorithm contrast may be compared across all weighting and filtering parameters and a highest contrast result may be selected. Some embodiments may decide whether to apply the correction (or not) based on contrast improvement, noise performance, dynamic range, and scatterer stationarity. In these embodiments, only the central 50% of the rows and columns in the tile are updated, unless the tile falls on the edge of the full image and then the update is applied to edge. This process may be repeated for all tiles for the given tile size, and may be repeated for each tile size FIG. 6 illustrates a block diagram of an example machine upon which any one or more of the techniques (e.g., methodologies) discussed herein may perform, in accordance with some embodiments. Machine 600 may be configured to implement a multi-hypothesis spatially-variant autofocus system for processing and focusing radar images as described herein. In these embodiments, phase corrections may be computed and multiple autofocus strategies may be applied to overlapping image tiles for progressively smaller image tile sizes. Correction factors for the image tiles may be selected on a per-tile basis based on various metrics.

In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be an image processing system, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a non-transitory computer-readable storage medium. In an example, the software, when executed by the underlying hardware of the module, causes the hardware to perform the specified operations. In some embodiments, the non-transitory computer-readable storage medium may store instructions for execution by one or more processors or processing circuitry, to perform the operations described herein.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 600 may include processing circuitry such as a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610, an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a storage device (e.g., drive unit) 616, a signal generation device 618 (e.g., a speaker), a network interface device 620 to connect with network 626, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A multi-hypothesis spatially-variant autofocus system for processing radar images, the system comprising: processing circuitry; and memory, the processing circuitry configured to perform an iterative process for a plurality of tile size iterations, wherein to perform the iterative process, the processing circuitry is configured to:
spatially-segment an initial radar image by extracting a plurality of overlapping image tiles of an initial tile size from the initial radar image, each overlapping image tile being a spatially segmented sub-image of the initial radar image;
compute an initial figure of merit for each overlapping image tile;
apply one or more window size weighting functions to each overlapping image tile;
apply more than one phase-gradient autofocus (PGA) algorithms to each window-size weighted version of each overlapping image tile;
determine a new figure of merit for each window size weighted version of the tiles for each of the applied PGA algorithms;
select, on a tile-by-tile basis, a correction vector for each overlapping image tile based on a comparison of the figures of merit, the figures of merit representing contrast metrics for each tile;
apply, on the tile-by-tile basis, the selected correction vector to each overlapping image tile to generate focused tiles; and
update the image by inserting non-overlapping portions of the focused tiles into the image, wherein the correction vector is selectable based on the figures of merit of different of the applied PGA algorithms,
wherein the memory is configured to store the selected correction vectors.

2. The system of claim 1, wherein for each subsequent tile-size iteration, the processing circuitry is configured to generate an updated image by progressively reducing a tile size of the overlapping image tiles, and
wherein for each subsequent tile-size iteration, overlapping image tiles with a progressively reduced tile size are extracted from the updated image that is generated from a prior tile-size iteration and an initial figure of merit for each tile is generated for the updated image.

3. The system of claim 2, further comprising a multi-hypothesis PGA engine configured for performing a plurality of different PGA algorithms, and
wherein for each iteration the processing circuitry is configured to apply at least two of the different PGA algorithms to each window-size weighted version of each tile by injecting each window size weighted version of the tiles into the multi-hypothesis PGA engine.

4. The system of claim 3, wherein the plurality of different PGA algorithms includes at least some of: a standard PGA weighting algorithm, a coherence-weighted PGA algorithm, a Super-PGA algorithm, and custom PGA weighting algorithm.

5. A multi-hypothesis spatially-variant autofocus system for processing radar images, the system comprising: processing circuitry; and memory, the processing circuitry configured to perform an iterative process for a plurality of tile size iterations, wherein to perform the iterative process, the processing circuitry is configured to:
extract overlapping tiles of an initial tile size from an initial radar image,
compute an initial figure of merit for each tile;
apply one or more window size weighting functions to each tile;
apply one or more phase-gradient autofocus (PGA) algorithms to each window-size weighted version of each tile;
determine a new figure of merit for each window size weighted version of the tiles for each of the one or more applied PGA algorithms;
select a correction vector for each tile based on a comparison of the figures of merit;
apply the selected correction vector to each tile to generate focused tiles; and
update the image by inserting non-overlapping portions of the focused tiles into the image,
wherein the memory is configured to store the selected correction vectors,
wherein for each subsequent tile-size iteration, the processing circuitry is configured to generate an updated image by progressively reducing a tile size of the overlapping tiles, and
wherein for each subsequent tile-size iteration, overlapping tiles with a progressively reduced tile size are extracted from the updated image that is generated from a prior tile-size iteration and an initial figure of merit for each tile is generated for the updated image,
wherein the system further comprise a multi-hypothesis PGA engine configured for performing a plurality of different PGA algorithms, and
wherein for each iteration the processing circuitry is configured to apply at least two of the different PGA algorithms to each window-size weighted version of each tile by injecting each window size weighted version of the tiles into the multi-hypothesis PGA engine,
wherein the plurality of different PGA algorithms includes at least some of: a standard PGA weighting algorithm, a coherence-weighted PGA algorithm, a Super-PGA algorithm, and custom PGA weighting algorithm,
wherein the initial figure of merit is an initial tile contrast,
wherein the new figure of merit is a new tile contrast, and
wherein for each window size weighted version of a tile and for each of the applied PGA algorithms, the correction vector that is selected for a tile is selected to provide a highest contrast.

6. The system of claim 5, wherein the processing circuitry is configured to:
apply the selected correction vector to an associated one of the tiles if the selected correction vector provides an improvement in tile contrast based on a comparison between the new tile contrast and the initial tile contrast, and
refrain from applying the selected correction vector an associated one of the tiles if the selected correction vector does not provide an improvement in tile contrast.

7. The system of claim 5, wherein for each subsequent tile-size iteration, the overlapping tiles with a progressively reduced tile size are extracted from lower-contrast portions of the updated image, and
wherein for a subsequent tile-size iteration the processing circuitry is configured to refrain from extracting overlapping tiles from higher-contrast portions of the updated image.

8. The system of claim 5, wherein the processing circuitry is configured to refrain from performing a subsequent tile-size iteration on a tile if in the tile had been illuminated in different portions of a synthetic aperture.

9. The system of claim 2, wherein the overlapping image tiles are extracted to have at least a 50% overlap, up to a 60% overlap.

10. The system of claim 5, wherein the initial figure of merit and the new figures of merit comprise one or more of a tile contrast, a noise performance, a dynamic range and a scatter stationarity.

11. The system of claim 10, wherein the initial radar image comprises a synthetic aperture radar (SAR) image.

12. The system of claim 10, wherein the initial radar image comprises a post-IFA (image formation algorithm) image, wherein scatterer migration through range cells had been removed by application of an image formation algorithm (IFA).

13. The system of claim 5, wherein prior to application of the one or more window size weighting functions to each tile, the processing circuitry is configured to set window sizes for each tile.

14. The system of claim 5, wherein the processing circuitry comprises one or more graphics processing units (GPUs) implementing GPU-accelerated computing.

15. The system of claim 5, wherein the processing circuitry comprises one or more central processing units (CPUs) running a scripting language.

16. A non-transitory computer-readable storage medium that stores instructions for execution by processing circuitry of a multi-hypothesis spatially-variant autofocus system for processing radar images, the processing circuitry configured to perform an iterative process for a plurality of tile size iterations, wherein to perform the iterative process, the processing circuitry is configured to:
   spatially-segment an initial radar image by extracting a plurality of overlapping image tiles of an initial tile size from the initial radar image, each overlapping image tile being a spatially segmented sub-image of the initial radar image;
   compute an initial figure of merit for each overlapping image tile;
   apply one or more window size weighting functions to each overlapping image tile;
   apply more than one phase-gradient autofocus (PGA) algorithms to each window-size weighted version of each overlapping image tile;
   determine a new figure of merit for each window size weighted version of the tiles for each of the applied PGA algorithms;
   select, on a tile-by-tile basis, a correction vector for each overlapping image tile based on a comparison of the figures of merit, the figures of merit representing contrast metrics for each tile;
   apply, on the tile-by-tile basis, the selected correction vector to each overlapping image tile to generate focused tiles; and
   update the image by inserting non-overlapping portions of the focused tiles into the image, wherein the correction vector is selectable based on the figures of merit of different of the applied PGA algorithms.

17. The non-transitory computer-readable storage medium of claim 16, wherein for each subsequent tile-size iteration, the processing circuitry is configured to generate an updated image by progressively reducing a tile size of the overlapping image tiles, and
   wherein for each subsequent tile-size iteration, overlapping image tiles with a progressively reduced tile size are extracted from the updated image that is generated from a prior tile-size iteration and an initial figure of merit for each tile is generated for the updated image.

18. The non-transitory computer-readable storage medium of claim 17, further comprising a multi-hypothesis PGA engine configured for performing a plurality of different PGA algorithms, and
   wherein for each iteration the processing circuitry is configured to apply at least two of the different PGA algorithms to each window-size weighted version of each tile by injecting each window size weighted version of the tiles into the multi-hypothesis PGA engine.

19. The non-transitory computer-readable storage medium of claim 18, wherein the plurality of different PGA algorithms includes at least some of: a standard PGA weighting algorithm, a coherence-weighted PGA algorithm, a Super-PGA algorithm, and custom PGA weighting algorithm.

20. The non-transitory computer-readable storage medium of claim 19, wherein the initial figure of merit is an initial tile contrast,
   wherein the new figure of merit is a new tile contrast, and
   wherein for each window size weighted version of a tile and for each of the applied PGA algorithms, the correction vector that is selected for a tile is selected to provide a highest contrast.

21. A method for focusing synthetic aperture radar (SAR) imagery, the method comprising:
   computing phase corrections and applying multiple autofocus strategies to overlapping image tiles for progressively smaller image tile sizes; and
   selecting correction factors for the image tiles on a per-tile basis based on various metrics,
   wherein each overlapping image tile is a spatially segmented sub-image of an initial radar image.

22. The method of claim 21, wherein applying multiple autofocus strategies comprises applying more than one phase-gradient autofocus (PGA) algorithms to window-size weighted versions of the overlapping image tiles for the progressively smaller image tile sizes, and
   wherein the various metrics comprise tile contrast, a noise performance, a dynamic range and a scatter stationarity, and
   wherein selecting the correction factors comprises determining whether an improvement in one or more of the various metrics results from application of a correction factor to an image tile.

23. The method of claim 22, further comprising:
   applying the selected correction factor to each image tile to generate focused tiles; and
   updating the image by inserting non-overlapping portions of the focused tiles into the image.

24. The method of claim 23, further comprising: refraining from selecting a correction factor for an image tile when an improvement in one or more of the various metrics results from application of a correction factor to an image tile is not achieved.

\* \* \* \* \*

UNITED STATES PATENT AND TRADEMARK OFFICE
CERTIFICATE OF CORRECTION

| | | |
|---|---|---|
| PATENT NO. | : 12,270,896 B2 | Page 1 of 1 |
| APPLICATION NO. | : 17/341952 | |
| DATED | : April 8, 2025 | |
| INVENTOR(S) | : Samaniego et al. | |

It is certified that error appears in the above-identified patent and that said Letters Patent is hereby corrected as shown below:

In the Specification

In Column 3, Line 40, after "of", insert --:--

In Column 5, Line 12, delete "log 2" and insert --log2-- therefor

In Column 6, Line 47, after "size", insert --.--

In the Claims

In Column 9, Line 13, in Claim 1, delete "algorithms" and insert --algorithm-- therefor In Column 9, Line 50, in Claim 4, after "of:", insert a linebreak In Column 10, Line 32, in Claim 5, after "of:", insert a linebreak In Column 11, Line 39, in Claim 16, delete "algorithms" and insert --algorithm-- therefor In Column 12, Line 17, in Claim 19, after "of:", insert a linebreak In Column 12, Line 41, in Claim 22, delete "algorithms" and insert --algorithm-- therefor In Column 12, Line 56, in Claim 24, after "comprising:", insert a linebreak Signed and Sealed this
Twenty-fourth Day of June, 2025

Coke Morgan Stewart
*Acting Director of the United States Patent and Trademark Office*